FACSIMILE SYSTEM
Filed Sept. 19, 1947
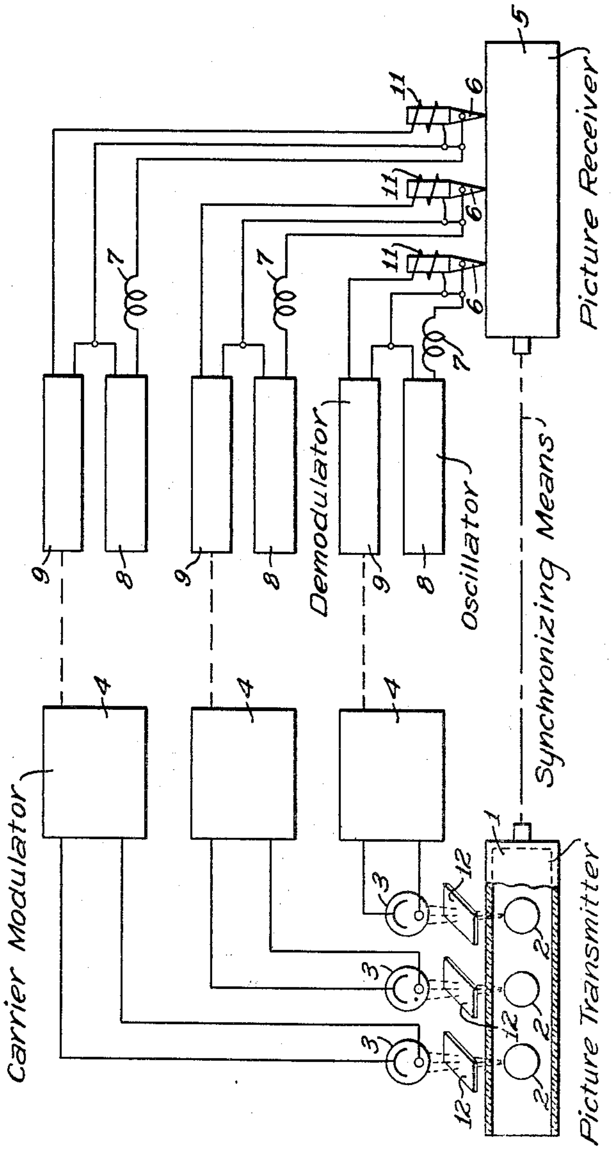
WITNESSES:
Robert C. Baird
Wm. C. Groome
INVENTOR
John L. Johnson and
John R. Boykin.
BY
F. W. Lyle
ATTORNEY Patented Nov. 20, 1951

2,575,714

UNITED STATES PATENT OFFICE 2,575,714

FACSIMILE SYSTEM

John L. Johnson, Catonsville, and John R. Boykin, Glen Burnie, Md., assignors to Westinghouse Electric Corporation, East Pittsburgh, Pa., a corporation of Pennsylvania Application September 19, 1947, Serial No. 775,052

10 Claims. (Cl. 178—5.2)

Our invention relates to facsimile systems and, in particular, it relates to a novel arrangement for printing the images or pictures being transmitted in such a system. In one aspect, it is particularly advantageous for printing pictures in color.

One object of our invention is to provide a comparatively simple arrangement for reproducing pictures or other images at a distant point.

Another object of our invention is to provide a simple, convenient and economical system for reproducing images in colors at a distance.

Still another object of our invention is to provide a novel form of printer by which images transmitted from a distance over electrical channels by varying the intensity of transmitted current may be reproduced in visible images at the receiving end of the system.

Still another object of our invention is to provide a novel and economical form of printing device by which images transmitted from a distance by varying electrical currents may be reproduced in colors at the receiving end of the system.

Still another object of our invention is to provide a novel means and method for printing on paper or the like images which are being transmitted from a distance by varying electrical currents.

Other objects of our invention will become evident upon reading the following description, taken in connection with the drawing in which the single figure is a schematic diagram of an image transmission and reproduction system embodying the principles of our invention.

One of the advantageous features of our system is that we cause the varying electrical energy changes modulated in accordance with the variations in tone from point to point of a transmitted picture to control the amplitude of vibration parallel to the surface of a printed sheet by a stylus or other marking device. That is to say, a stylus traversing successive parallel paths over the paper being printed is continually vibrated in a direction normal to the path it is traversing; and the amplitude of this vibration determines the intensity from point to point along the path of the image being printed. Thus the stylus may, if desired, be a simple pen-point supplied with ink of any desired color from a suitable reservoir; and by providing a plurality of such styluses marking different colors, colored pictures may readily be reproduced.

Referring in detail to the drawing, a picture or other view which is to be reproduced is supported on the cylindrical surface of a drum 1 at the transmitter. The drum 1 may be hollow and of transparent material, and have supported in its interior optical source 2 of any type well known in the art for projecting a narrow beam of light. The drum 1 carrying the picture is then continuously rotated about its central axis and at the same time given a small axial motion so that the light beam is directed through its cylindrical wall, and through the picture supported thereon, in a helical path. The axial movement is made such that the width of the helical path equals the width of the light beam passing through the cylindrical wall, so that the picture area has been completely scanned by the light beam when the cylinder has moved axially by a distance equal to the width of the picture. Such arrangements are conventional in the picture transmission art and require no detailed description here.

In line with the beam of light thus transmitted from the optical system 2 through the picture is positioned a photo-electric cell 3 having its terminals connected to control the intensity of electrical images being transmitted over a communication channel to the picture receiver. Arrangements by which photo-electric cells thus control energy are well known in the picture transmitting art for all types of channels, both wire and radio. For example, the cell 3 may modulate the output of a carrier wave generator 4 so that it fluctuates in intensity in accordance with the variations from point to point of the transparency of the picture moving across the light beam from source 2. The amplitude of the modulation impressed on the transmitting wave is made proportional to the output current of cell 3.

The picture receiver of our invention comprises a cylindrical drum 5 on the surface of which is rolled a paper or other object on which the picture is to be printed. The drum 5 is rotated in synchronism with the transmitter drum 1, synchronism being maintained between the two by any means well known in the picture transmitting art. Such means may be electrical or may be mechanical, both types of synchronizing device being too well known to require detailed description here.

The drum 5 is, like the transmitter drum 1, given an axial motion so that it traverses a distance equal to the width of the picture being printed in the same period as that in which the drum 1 moves the light beam from source 2 throughout the width of the transmitted picture.

A stylus 6 bears on the paper on the surface of cylinder 5 and is provided with means to cause it to make a mark on the paper. For example, the stylus 6 may, in some instances. conveniently take the form of a pen-point supplied with ink from a suitable reservoir (not shown). The stylus 6 is supported for lateral displacement and is provided with a mechanism comprising a magnetic core supported for movement within a solenoid 7 which is supplied with current from an oscillator 8 having a comparatively low frequency. The oscillator 8 will thus impart a vibratory movement to the stylus 6 in a direction parallel to the axis of the cylinder 5. The rotation of the cylinder 5, by continuously moving the paper it bears in a tangential direction, will cause the stylus 6 when thus vibrated, to mark a more or less sinusoidal track on the surface of the paper. The distance between successive troughs of this sinusoidal path will, of course, be determined by the relation between the frequency of the oscillator 8 and the velocity with which the paper is moved in a tangential direction by cylinder 5. The frequency of oscillator 8 should be so related to this tangential velocity that the distance between successive troughs of the sinusoidal path is equal to the width of the line being marked on the paper by the stylus 6.

The amplitude of the currents being sent through solenoid 7 by oscillator 8 will, of course, determine the amplitude of the sinusoids constituting the path being marked by stylus 6. The oscillator 8 is controlled by a demodulator 9 having an output voltage which is proportional to the intensity of the electrical energy being transmitted from source 4 over the transmission channel. The demodulator 9 likewise supplies its output current to a second solenoid 11 which surrounds a second magnet core on stylus 6 and is arranged to lift the stylus 6 from contact with the paper on cylinder 5 whenever the energy transmitted from source 4 is of sufficient intensity. It will facilitate this operation if an amplifier which overaccentuates the higher amplitude modulations corresponding to white areas on the transmitted picture is embodied in the demodulator system.

The photocell 3 and carrier source 4 are arranged so that whenever a particular point on the picture on drum 1 is white in color, the modulations in energy transmitted from source 4 are a maximum; and that as points of darker hue pass the light beam from source 2, the modulation of the energy transmitted from source 4 decreases. The solenoid 11 is, accordingly, arranged so that when the above-mentioned maximum modulation occurs, it will lift the stylus 6 from contact with the paper on cylinder 5 and leave the latter white and unmarked. On the other hand, the solenoid 11 is so arranged that when the modulation of source 4 drops below the maximum condition corresponding to a white area on the transmitted picture, stylus 6 will make contact with the paper on cylinder 5 and mark the latter. However, it will be noted that the modulation of the transmitted energy from source 4 depends upon the darkness of the tone in the picture at the point being traversed at any instant by the light beam from source 2; and at the same time the amplitude of the output of oscillator 8 depends upon the output from demodulator 9. Thus it will be seen that the amplitude of the sinusoidal vibrations impressed by oscillator 8 on stylus 6 correspond from instant to instant to the darkness in tone of the picture being traversed by the light beam from source 2.

When the tone of the particular point on the picture on drum 1 is intensely dark, the modulation transmitted from source 4 to demodulator 9 will be low and, correspondingly, the amplitude of the output voltage of oscillator 8 is made a maximum. Thus, the stylus 6 will be vibrated through a path of large amplitude normal to the direction of its movement over the paper on cylinder 5 and will, in effect, darken a wide path along the paper. As the tone of the points traversed by the light beam through the picture on drum 1 becomes lighter, the output of demodulator 9 will decrease the amplitude of the vibrations impressed on stylus 6 by oscillator 8, and the width of the path being marked on the paper on cylinder 5 will thus decrease. As previously stated, a completely white spot on the picture on transmitter drum 1 will cause the stylus 6 to be lifted completely out of contact with the paper covering cylinder 5.

As the stylus 6 traverses the successive turns of a helical path over the surface of the paper being printed, it will be evident that portions of the paper may remain white in the areas intervening between adjacent paths; and, of course, the breadth of these white areas will be greater where the path marked by the stylus on the surface of the paper is narrow than at those portions where this path is broad. It has already been shown that the breadth of the path marked by stylus 6 corresponds to the darkness of tone from point to point along the picture being transmitted. It will thus be evident that points of light tone on the picture carried by drum 1 will produce a large ratio of white paper to blackened paper at corresponding points on the paper carried by cylinder 5, and that dark areas on the transmitted picture will produce a large ratio of blackened path to white area on the cylinder 5 picture. By making the pitch of the helical path traversed by stylus 6 just equal to the amplitude of the vibrations impressed on stylus 6 by oscillator 8 when a completely black area is passing the light beam from source 2, it will be evident that the stylus 6 will completely blacken the corresponding points on the printed picture and leave no white paper intervening between the successive turns of the helical path.

The arrangement so far described corresponds to the improvement of our system to reproduce pictures in black and white. When it is desired to reproduce colored pictures, the transmitter drum 1 is provided with a plurality of light sources 2 and a plurality of photocells 3. Each of these elements is substantially the same as has already been described and each photocell 3 is arranged to control a carrier modulator 4 to transmit electrical energy over its own channel to the picture receiver.

At the receiver, a system of elements 6, 7, 8, 9, 11 identical with that already described is provided for each of the light sources 2. However, the different styluses are fed with inks of different color.

If now it is desired to transmit pictures in three different colors, three separate light sources 2 are provided for the transmitter drum 1 and each of the corresponding three photocells 3 is provided with a different color screen 12, respectively corresponding to the three colors which it is desired to transmit. These colors may advantageously be complementary colors. The stylus 6, which is controlled by the photocell corresponding to each color screen, is supplied with ink which absorbs the same color as the light transmitted by the screen. It will thus be evident that when a particular area of the picture on drum 1 transmits one color of light, let us say blue, readily, the photocell 3, which is aligned with the blue screen 12, will control its associated stylus 6 to vibrate through smaller amplitudes, thereby producing only a narrow mark on the ink which absorbs blue light at the corresponding point of the paper carried by cylinder 5. If the blue coloration at that spot in the picture on drum 1 is highly intense, the stylus will be lifted completely from the paper at the corresponding point on cylinder 5. Thus at the latter point, little or no blue light will be absorbed, so blue light will be reflected from that point to the eye of anyone who later looks at the paper on cylinder 5. On the other hand, if a spot on the picture on drum 1 transmits no blue light to its associated photocell 3, the associated stylus 6 will vibrate through a wide angle and mark a wide area at the corresponding point on cylinder 5 with ink which absorbs blue light. Substantially no blue light will thereafter be reflected by that spot of the eye of anyone looking at the paper which is on cylinder 5. The color of ink which absorbs blue light is called yellow. The color of ink which absorbs green light is called magenta. The color of ink which absorbs red light is called blue green.

The respective light sources 2 are so arranged that their light beams are traversed successively by each given area of the picture on drum 1, in consequence of which each elemental area of the transmitted picture successively controls the output being transmitted over one of the transmission channels, and hence controls the width of a mark being made in corresponding colored ink on the paper on cylinder 5. Each point on the latter is accordingly covered with inks which absorb all light colors which are absent from corresponding points in the picture on drum 1, and hence leave the point on the paper being printed capable of reflecting to the eye of an observer those colors, and those colors only, which are present at corresponding points of the picture being copied.

It will readily be evident that the styluses traversing the paper on cylinder 5 may be placed in positions corresponding to those occupied relative to the transmitted picture on drum 1, so that each stylus on printing drum 5 will touch a given point on the reproduced picture at the same instant that its controlling light beam on the transmitter drum 1 traverses the corresponding point on the transmitted picture. To take an example, the three light sources 2 at the transmitter drum 1 may be located in the same plane normal to the axis thereof at points spaced 120 degrees apart, and that, correspondingly, the three styluses 6 on the receiver drum 5 may be positioned in the same plane normal to the axis of drum 5 and 120 degrees apart. This arrangement would, of course, differ from the purely schematical showing of the present drawing and is merely given as a simple illustration of homologous positioning of the light beams at transmitter and the recording styluses at the receiver. It would, however, a simple matter to locate the styluses at the receiver side by side exactly as they are shown in the present drawing and make them properly reproduce pictures picked up by three light beams located at the transmitter exactly as the present drawing shows

We claim as our invention:

1. Means for producing a positive visible image which is to correspond in intensity from point to point to the variations with time of energy flowing over a transmission channel comprising means for supporting a medium to be marked, means for traversing said medium in adjacent paths by a pigment marking means, and means for vibrating said marking means parallel to the surface of said medium and normal to the direction of said paths, and means for controlling the amplitude of said vibrations in correspondence with the intensity from moment to moment of said energy.

2. A positive picture transmitting system comprising means for controlling the output of energy in a transmission channel from moment to moment in correspondence with the variations in intensity from point to point on a view to be transmitted, means for moving a pigment marking element over the surface of a medium to be imprinted with said picture, means for vibrating said element in a direction parallel to the surface of said medium and normal to its path of movement, and means for controlling the amplitude of said vibration in correspondence with the intensity of said energy.

3. A view-reproducing device for positive picture transmission systems comprising means for moving a pigment marking stylus relative to a view-support surface on which said picture is to appear in adjacent paths thereover, a winding arranged to move said stylus along said surface in a direction normal to said path of movement, a source of alternating current connected to said winding, and means to control the voltage of said alternating-current source in correspondence to the tone-variations of a view to be recorded.

4. A view-reproducing device for positive picture transmission systems comprising means for moving a pigment marking stylus relative to a view-support surface on which said picture is to appear in adjacent paths thereover, a winding arranged to move said stylus along said surface in a direction normal to said path of movement, a source of alternating current connected to said winding, means to control the voltage of said alternating-current source in correspondence to tone-variations of a view to be recorded, and additional means to render said stylus inoperative for marking in response to said control means.

5. A printing apparatus for reproducing positive pictures in a picture transmitting system which comprises a cylindrical support for a medium to be printed with said pictures, a pigment marking stylus adapted to make marking contact with said medium, means for rotating said cylinder and imparting axial movement thereof relative to said stylus, a winding adapted to move said stylus in a direction parallel to the axis of said cylinder, an alternating-current generator connected to supply current to said winding, and means to control the output of said generator in correspondence with energy in a control channel.

6. A printing apparatus for reproducing positive pictures in a picture transmitting system which comprises a cylindrical support for a medium to be printed with said pictures, a pigment marking stylus adapted to make marking contact with said medium, means for rotating said cylinder and imparting axial movement thereof relative to said stylus, a winding adapted to move said stylus in a direction parallel to the axis of said cylinder, an alternating-current generator connected to supply current to said winding, means to control the output of said generator in correspondence with energy in a control channel, and means responsive to said energy to render said stylus inoperative to mark said medium.

7. In a view transmission system, means for moving a view to be transmitted relative to an energy modulation means, means for rendering said modulation means responsive, point by point, to the tone of said view during said movement, means responsive to said energy to control the amplitude of the output current of an alternating-current generator, motor means energized by said generator to impart vibratory movement to a marking stylus, a cylindrical support for material to be marked with said view by said stylus, said material being positioned on the surface of said support and the axis of said cylindrical support being parallel to the direction of vibration of said stylus, means to render said stylus inoperative to mark said material in response to amplitudes of said modulation which are about a predetermined value, and means for rotating said cylindrical support about its axis, and for moving it parallel to its axis to cause said stylus to trace substantially parallel paths along the surface of said material.

8. An arrangement of the character described in claim 9 in which a plurality of energy channels between the transmitting and the receiving devices are provided and in which the respective styluses at said receiver make marks with pigments of different colors, which marks correspond in extent with the amount of light, of the same color which said pigment absorbs, which constitutes the tone to which said modulations respectively respond.

9. A printing apparatus for reproducing pictures in a picture transmitting system which comprises a cylindrical support for a medium to be printed with said pictures, a plurality of different color pigment marking styluses adapted to make marking contact with said medium, means for rotating said cylinder and imparting axial movement thereof relative to said styluses, windings adapted to move said styluses in a direction parallel to the axis of said cylinder, an alternating-current generator connected to supply current to said windings, and means to control the output of said generator in correspondence with energy in a control channel.

10. A picture transmitting system comprising, means for controlling the output of energy in a channel from moment to moment in correspondence with the variations in intensity from point to point on a view to be transmitted, means for moving a plurality of different color pigment marking elements over the surface of a medium to be imprinted with said picture, means for vibrating said elements in a direction parallel to the surface of said medium and normal to its path of movement, and means for controlling the amplitude of said vibrations in correspondence with the intensity of said energy.

JOHN L. JOHNSON.
JOHN R. BOYKIN.

REFERENCES CITED

The following references are of record in the file of this patent:

UNITED STATES PATENTS

| Number | Name | Date |
|---|---|---|
| 1,776,097 | Baird | Sept. 15, 1930 |
| 2,079,970 | Speed | May 11, 1937 |
| 2,185,139 | Wurzburg | Dec. 26, 1939 |
| 2,209,183 | Bennett | July 23, 1940 |
| 2,272,638 | Hardy | Feb. 10, 1942 |
| 2,278,940 | Murphy | Apr. 7, 1942 |
| 2,415,450 | Swann | Feb. 11, 1947 |
| 2,431,360 | Philpott | Nov. 25, 1947 |
| 2,461,515 | Bronwell | Feb. 15, 1949 |